Aug. 14, 1951

R. BOWN

TIME DIVISION MULTIPLEX SYSTEM FOR SIGNALS OF DIFFERENT BAND WIDTHS 2,564,419

Filed April 14, 1947

2 Sheets-Sheet 1

INVENTOR
R. BOWN
BY
George C. Ford
ATTORNEY

Aug. 14, 1951 R. BOWN 2,564,419

TIME DIVISION MULTIPLEX SYSTEM FOR SIGNALS OF DIFFERENT BAND WIDTHS

Filed April 14, 1947 2 Sheets-Sheet 2

INVENTOR
R. BOWN
BY
Lloyd C. Lord
ATTORNEY

Patented Aug. 14, 1951

2,564,419

UNITED STATES PATENT OFFICE 2,564,419

TIME DIVISION MULTIPLEX SYSTEM FOR SIGNALS OF DIFFERENT BAND WIDTH

Ralph Bown, Maplewood, N. J., assignor to Bell Telephone Laboratories, Incorporated, New York, N. Y., a corporation of New York Application April 14, 1947, Serial No. 741,331

1 Claim. (Cl. 179—15)

This invention relates to time division multiplex communication systems.

In communication systems employing time division a plurality of separate messages or signals are transmitted between stations over a single communication link. This communication link, which may comprise a radio channel, a wire line, a coaxial cable or other transmission medium, is allotted successively and in turn to each of the plurality of messages and samples of each are transmitted at recurrent intervals. The single shared communication link is thus effectively divided into a plurality of message channels on a time division basis. At the receiving station, successively received message samples are applied to multiplexing equipment which distributes them to separate outputs.

It has been found that for satisfactory reproduction of a signal of a given band width, the signal must be sampled at a rate or frequency which is equal to at least twice the highest frequency contained in the signal. Thus the broader the desired message channel band widths the higher must be the rate at which the transmission link is assigned to each message channel.

A typical time division multiplex communication system intended for voice transmission is described in Patent 2,262,832 to E. M. Deloraine et al., issued November 18, 1941. In this type of system a microwave radio link is employed and a plurality of message channels are sampled at a fixed repetition rate. Information as to the message or signal present in each channel at the time of sampling is transmitted in the form of pulses the time positions of which in respect to fixed pulses are varied or modulated in accordance with a process known as "pulse position modulation." An oscillator at the transmitter of this system operates the multiplex equipment at the sampling or frame repetition rate and an oscillator at the receiver of the system is synchronized to operate with the oscillator first mentioned. As a basic sampling rate of 8,000 per second is assumed, each of the channels of such a system can accommodate signals of band width extending from 0 to substantially 4,000 cycles.

Channel band widths of this order of magnitude are satisfactory for telephone communication but are too narrow for the proper transmission of high quality program material and are undesirably narrow for the transmission of music of broadcast quality. On the other hand, such channel band widths are wasteful if telegraph code signals or the like are to be transmitted. Thus it may be seen that on occasion it may be desirable to transmit over the same multiplex system high quality program material requiring a channel band width of approximately 12,000 to 15,000 cycles; ordinary broadcasting material requiring a channel band width of 6,000 to 8,000 cycles and other signals requiring band widths of only 1,000 cycles or even 500 cycles or less.

Accordingly, it is an object of the present invention to provide methods of and means for employing a time division multiplex communication system having a fixed number of channels of equal band widths for the transmission of signals having band widths greater than the band width of the individual channels and for the transmission of signals having band widths equal to or less than the band width of each of the channels.

In accordance with the invention a time division multiplex system providing a plurality of channels of predetermined equal band widths is employed to accommodate messages requiring channel band widths greater than, equal to, and less than the predetermined band width. Signals having band widths greater than that of a single channel are employed to modulate a plurality of the channels in each frame. Signals of the same band width as a channel are each employed to modulate a single channel. Two or more signals having band widths less than that of a single channel share the use of a single channel, for example two signals of band widths approximately half that of a channel may be utilized alternately, one modulating the channel on non-sequential occurrences and the other modulating the same channel on its remaining occurrences.

The above and other objects and features of the invention will appear in the following detailed specification taken in connection with the drawings in which.

Figure 1:
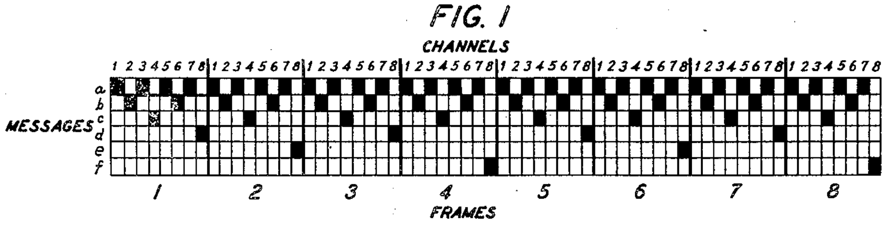
Fig. 1 is a diagram showing the assignment of the sub-channels of a typical time division multiplex system for the transmission of signals requiring different message channel band widths in accordance with the invention.

In Fig. 1 the horizontal axis of the diagram is divided into eight large divisions representing successive frames 1 through 8 of a time division multiplex. For purposes of illustration and in accordance with the assumption made above, each of the frames is divided among eight channels, 1 through 8, each of which can accommodate signals having frequencies up to at least 3,000 cycles per second. The diagram shows the assignment to the eight channels of such a system of several messages of different band widths, for example, message *a* requiring a band of frequencies extending from 0 to approximately 12,000 cycles per second, message *b* requiring a band of frequencies from 0 to approximately 6,000 cycles per second, message *c* requiring a band of frequencies from 0 to 3,000 cycles per second, message *d* requiring a band of frequencies from 0 to approximately 1,500 cycles per second and messages *e* and *f* each requiring a band of frequencies from 0 to approximately 750 cycles per second.

As shown by the filled-in squares, message *a* is applied in parallel to channels 1, 3, 5 and 7 of each frame. Thus this signal is sampled at four times the basic sampling rate or at a rate of 32,000 samples per second. Accordingly, frequency components in message *a* up to at least 15,000 cycles per second may be transmitted to the remote station. Message *b* is assigned to channels 2 and 6 of each frame thus occupying channels not previously employed for the transmission of message *a* and this message is sampled at twice the basic sampling frequency, i. e., at a frequency of 16,000 times per second. The frequency components in message *b* up to approximately one-half this repetition rate, that is, up to approximately 6,000 to 7,000 cycles may be transmitted satisfactorily. Message *c* which is of the same band width as the message channels is assigned to subchannel 4, is sampled once per frame, and is transmitted over the system in the usual manner as in the system described in Patent 2,262,838, referred to above.

Message *d* which is of band width approximately one-half that of a single channel and messages *e* and *f* which each require a band of frequencies equal to approximately one-quarter that accommodated by a single channel share the use of channel 8 of the system. Thus message *d* is employed to modulate channel 8 on non-sequential occurrences thereof as, for example, in the first, third, fifth and seventh frames, while messages *e* and *f* alternately are employed to modulate channel 8 upon its remaining occurrences, message *e* being transmitted over channel 8 in the second and sixth frames and message *f* being transmitted over the channel in the fourth and eighth frames.

From the above, it will be recognized that a time division multiplex having eight channels of a normal band width of approximately 4,000 cycles is fully employed for the transmission of messages of widely different band widths, ranging from a band width of approximately 750 cycles for messages *e* and *f* to approximately 12,000 to 15,000 cycles for message *a*.

Figure 2:
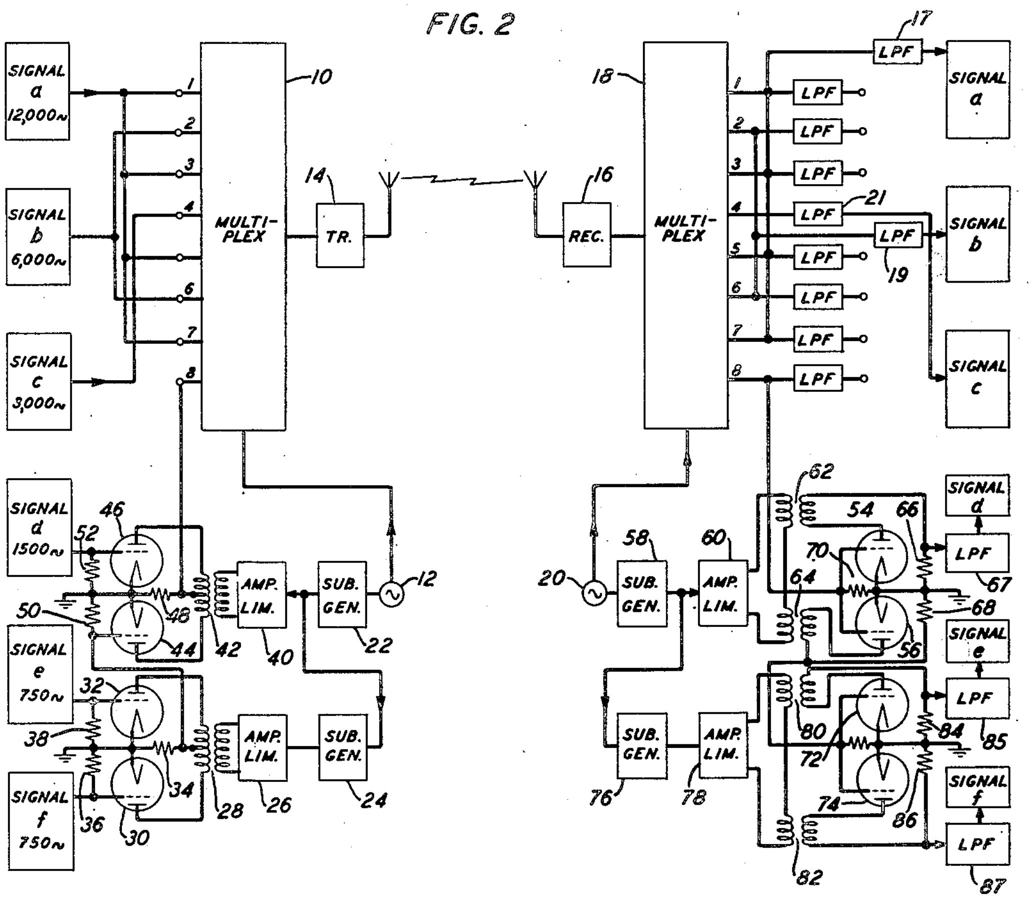
Fig. 2 is a schematic circuit diagram partially in block form of a communication system representing an embodiment of the invention.

Fig. 2 is a schematic diagram of a time division multiplex system in accordance with the present invention. At the transmitter there is provided a time division multiplex and modulator unit 10 having a plurality of message channel input connections 1 through 8. The time division multiplex and modulator unit 10 is controlled by an oscillator 12, which for example may operate at 8,000 cycles per second, and connects channels 1 through 8 successively and recurrently to a radio transmitter 14.

At the receiving station the signals from a radio receiver 16 are applied to a receiving time division multiplex and demodulator unit 18. An oscillator 20 which may conveniently be a multivibrator having a free-running frequency of slightly less than 8,000 cycles per second controls a multiplex distributor included in time division multiplex 14 which serves to distribute the successively transmitted message channel signals received over the radio line to output circuits of channels 1 through 8, inclusive. This oscillator may be synchronized with oscillator 12 through the use of a separate channel or by other appropriate means.

The particular modification of this basic system shown as an example herein is intended to adapt the system for the transmission of the six messages considered in connection with the diagram of Fig. 1. For the transmission of message *a*, the input terminals of channels 1, 3, 5 and 7 at the transmitter are connected in parallel and at the receiver the output leads of multiplex 18 for channels 1, 3, 5 and 7 are connected in parallel. The parallelled output of channels 1, 3, 5 and 7 is applied to a low-pass filter 17 having a cut-off at approximately 12,000 cycles per second. This filter removes the sampling rate component of 32,000 samples per second and higher frequency components and transmits only the frequencies of message *a*.

In similar fashion message *b* is applied to the input terminals of channels 2 and 6 of time division multiplex 10 at the transmitter. At the receiving station output terminals corresponding to channels 2 and 6 are connected in parallel and the output is applied to low-pass filter 19 having a cut-off at approximately 6,000 cycles. This filter removes the 16,000 cycle sampling frequency component from message *b*.

Message *c* is of the same effective band width as that of the individual channels of the system, and is applied to input terminal 4 of multiplex 10. At the receiver it appears at the output terminal of channel 4 of receiving multiplex 18 and is thence applied to a low-pass filter 21 having a cut-off at 4,000 cycles.

It will be recalled from the consideration of the timing diagram of Fig. 1 that channel 8 of the communication system is shared by messages *d*, *e* and *f*, the available time of this subchannel being divided equally between message *d* and messages *e* and *f*. For this purpose switching equipment is provided at the transmitting and receiving terminals of the system. At the transmitter, for example, a submultiple generator 22 which may conveniently be of the multivibrator type is driven by the 8,000 cycle oscillator 12 and provides output signals of 4,000 cycles per second. The 4,000 cycle output of submultiple generator 22 is applied to a second submultiple generator 24 having an output of 2,000 cycles per second. The 2,000 cycle output of submultiple generator 24 is applied to an amplitude limiter 26 to obtain a 2,000 cycle square wave. The output of the limiter is applied through a transformer 28 to a pair of switching or gate tubes 30 and 32 shown herein as triode-type vacuum tubes. These switching tubes are connected in a balanced circuit with the anodes connected to the opposite ends of the secondary winding of transformer 28 and the center tap of the transformer is connected through resistor 34 to ground. The cathodes of the switching tubes are connected together and to ground while the grids thereof are connected through resistors 36 and 38 to the cathodes. The signals corresponding to message *e* are applied to the grid of switching tube 32, while those corresponding to message *f* are applied to the grid of switching tube 30.

Because of the balanced circuit connection, the square wave signal from limiter 26 renders switching tubes 30 and 32 alternately conductive. Accordingly, the signals of message *e* and message *f* appear alternately across resistor 34, each of the signals appearing thereacross at a rate of 1,000 times per second.

The output of the switch just described is applied to a second electronic switch in which it is interleaved with signals corresponding to message *d*. In this switch the 4,000 cycle output of the submultiple generator 22 is also applied to an amplitude limiter 40 of conventional type to obtain a square wave having a repetition rate of 4,000 pulses per second and this signal is applied through a transformer 42 to a pair of switching or gate tubes 44 and 46 shown herein as comprising triode-type vacuum tubes which are connected in a balanced circuit. Thus the anodes of switching tubes 44 and 46 are connected to opposite ends of the secondary winding of transformer 42, the center tap of which is connected through resistor 48 to ground. The cathodes of switching tubes 44 and 46 are connected together and to ground while the grids thereof are connected through resistors 50 and 52 to the cathodes. Signals of message *d* are applied to the grid of switching tube 46, while signals corresponding to messages *e* and *f* together are applied to the grid of switching tube 44.

In the operation of this second electronic switch the signals of message *d* and the combined signals of messages *e* and *f* appear alternately across resistor 48, message *d* and the combination of messages *e* and *f* each appearing thereacross 2,000 times per second. The combined signals from messages *d*, *e* and *f* appearing across resistor 48 are applied to subchannel input 8 of transmitting multiplex 10.

At the receiving station the output of channel 8 is applied to switching equipment to distribute message signals *d*, *e* and *f* to the proper output subchannels. The combined signal is first applied to an electronic switch or distributor somewhat similar to those at the transmitter and comprising vacuum tubes 54 and 56 which may conveniently be of the triode type. This switch is driven by a 4,000 cycle square wave obtained through a submultiple generator 58, operated by the oscillator 20 of the receiving multiplex. The 4,000 cycle signal obtained from this submultiple generator is converted into a square wave by an amplitude limiter 60. This square wave is applied through a transformer having two secondary windings 62 and 64 to switching tubes 54 and 56. For this purpose the anode of switching tube 54 is connected through secondary winding 62 and resistor 66 in series to ground, while the anode of switching tube 56 is connected through secondary winding 64 and resistor 68 to ground. The cathodes of the switching tubes are connected together and to ground while the grids thereof are connected together and through a common resistor 70 to ground. The square wave from amplitude limiter 60 alternately actuates switching tubes 54 and 56 so that the signals applied to the grids thereof appear alternately across resistors 66 and 68. This switch operates at the same frequency and in synchronism with the switch at the transmitter including switching tubes 46 and 48. Accordingly, signals representing message *d* appear across one of the anode resistors, for example, resistor 66, while signals representing the combinations of messages *e* and *f* appear across the other anode resistor 68. The signals appearing across anode resistor 66 are applied through low-pass filter 67 having a cut-off at approximately 1500 cycles to message output terminal *d*, while those appearing across anode resistor 68 and representing the combination of messages *e* and *f* are applied to a second electronic switch comprising vacuum tubes 72 and 74 similar to that just described. In this switch a 2,000 cycle signal is obtained from a submultiple generator 76 driven by the output of submultiple generator 58 and is applied through an amplitude limiter 78 to obtain a square wave. This square wave is applied through a transformer having secondary windings 80 and 82 to switching tubes 72 and 74 which are connected in a circuit identical to that employed in the switching circuit including vacuum tubes 54 and 56 described above. Thus, the message signals *e* and *f* applied together to the grids of vacuum tubes 72 and 74 appear alternately across anode resistors 84 and 86. The signal appearing across anode resistor 84 is applied through low-pass filter 85 to message output terminal *e*, while that across anode resistor 86 is applied through low-pass filter 87 to message output terminal *f*, low-pass filters 85 and 87 having cut-offs at approximately 750 cycles.

The illustrative system described above has been based on the use of a time division multiplex system having eight channels, each capable of accommodating a band of frequencies approximately 4,000 cycles wide. It will be recognized that the invention is of equal application to multiplex systems having other numbers of equal channels capable of accommodating signals of broader or narrower band widths. If multiplex systems of a greater number of channels than the eight in the system described are employed, still wider signaling bands may be transmitted. For example, a nine-channel system may be employed for transmitting messages having band widths 3 or 9 times the basic channel width. In general, a time division multiplex system may be employed in accordance with the invention to transmit signals, the band widths of which are equal to the channel band width multiplied by any submultiple of the number of multiplex channels provided and also signals the band widths of which are submultiples of the channel band width. Thus a twelve-channel multiplex having a basic channel band width of 4,000 cycles may, in accordance with the invention, be employed for the transmission of signals of the following band widths: 4,000 cycles, 8,000 cycles, 12,000 cycles, 16,000 cycles, 24,000 cycles and 48,000 cycles and signals of band widths of which are submultiples of 4,000 cycles.

It will be noted in connection with the system described above, that when it is desired to transmit a signal requiring a band width greater than that of a single channel, the channels of the multiplex allotted for that purpose are so chosen that the signal is sampled at a uniform rate. Thus in Fig. 1 message signal *b* is shown as transmitted over channels 2 and 6 of an eight-channel multiplex system. Accordingly, there is a uniform interval of 3 channels between each sampling of the signal. It is also possible to transmit broad band messages in accordance with the invention using channels which are not uniformly spaced in time. This may be desirable, or necessary, for example, when there is failure of one or more channels because of breakdown in the terminal equipment or when the total load on the system is such that it is not feasible to use evenly spaced channels for a particular broad band message. One system for transmitting a broad band signal with non-uniform sampling is shown in the schematic diagram of Fig. 3. In this arrangement transmitting multiplex and modulator unit 90 and receiving multiplex and modulator unit 92 may be of the type disclosed in Patent 2,262,832 referred to above and may be arranged to provide twelve channels. The output of receiving multiplex 90 is applied to a transmitter 94 for transmission to a receiver 96 which furnishes the input to multiplex 92.

If each of the twelve channels 1′–12′ is allotted 10 microseconds, the total frame time for the multiplex is 120 microseconds and the sampling or frame frequency is 8,333 cycles. Thus each channel is capable of satisfactory transmission of signals having an absolute frequency band of approximately 3,500 cycles. Let it now be assumed that it is desired to transmit a signal having a band width of approximately 11,000 cycles. It will be recognized in view of the arrangements described above that this may be accomplished by parallelling the input connections of channels 3′, 7′ and 11′ of multiplex 90 and parallelling output connections of these channels at receiving multiplex 92. The parallelled outputs may be to a low-pass filter having a cut-off of approximately 11,000 cycles. Similarly, channels 2′, 6′ and 10′ might be employed.

Figure 3:
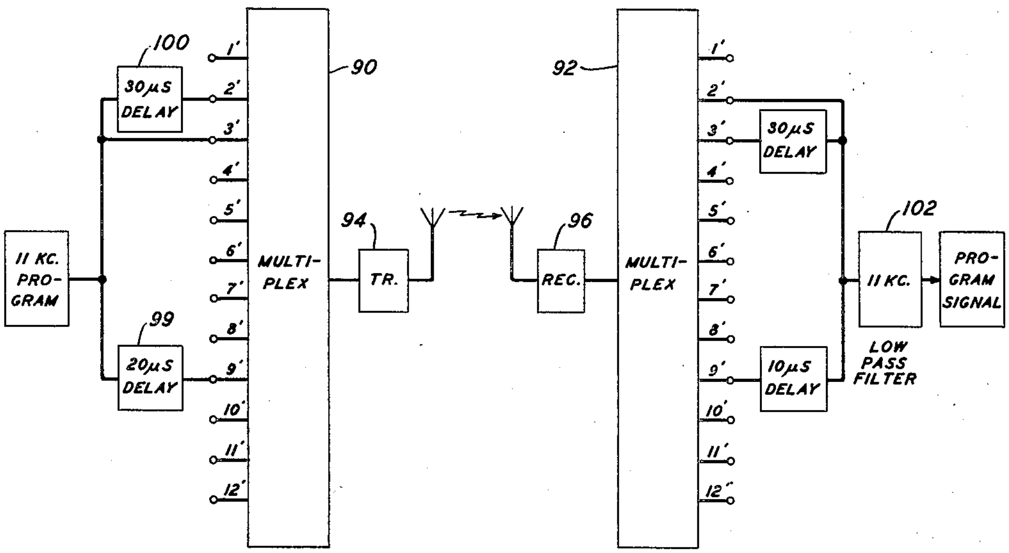
Fig. 3 is a block diagram of a second embodiment of the invention.

Let it be assumed, however, for purposes of illustration, that it is desired to employ channels 2′, 3′ and 9′ for the transmission of signals of this particular band width. This is accomplished as shown in Fig. 3 through the insertion of suitable delay networks in the inputs to certain channels of the transmitting multiplex and in the output connections of certain channels at the receiving multiplex. Thus, if the sample transmitted over channel 3′ is taken as a reference the sample in channel 9′ will be taken 20 microseconds later than it would be if taken at the sampling time of channel 7. Accordingly, delay network 99 is inserted in the input of channel 9′ to delay the signal applied thereto by 20 microseconds. Similarly, the sample in channel 2′ is taken 30 microseconds later than it would have been in channel 11. Accordingly, the inserted delay network 100 is arranged to delay the signal to be transmitted by 30 microseconds. Thus, it will be understood that the signal is effectively sampled in channels 2, 3 and 9 as though it were actually applied to channels 3, 7 and 11.

At the receiver the outputs of channels 2, 3 and 9 are connected in parallel for application to the input of a low-pass filter 102 having a cut-off frequency of approximately 11,000 cycles. Since delays were introduced at the transmitter, it is necessary to introduce complementary delays at the receiver in order that the samples applied to the low-pass filter be evenly spaced or applied at a uniform rate. Accordingly, the output of channel 3 is applied to a delay network 104 which introduced a delay of 30 microseconds and the output of channel 9 is applied to a delay network 106 which introduced a delay of 10 microseconds. Thus the sample output pulses applied to the low-pass filter occur at a uniform rate and may be acted upon by the filter to recover the message signal.

For purposes of illustration, the invention has been described above as applied to a time division multiplex communication system employing pulse length at position modulation. The invention is equally applicable, however, to other types of time division multiplex systems and may be employed in systems in which other types of pulse modulation are used on a time division basis.

What is claimed is:

In a time division multiplex communication system wherein the use of a transmission link is assigned successively and recurrently at a basic rate to a plurality of channels for equal channel periods, a transmitting multiplex and a receiving multiplex operating in synchronism, means operating in synchronism at a submultiple of the basic rate and associated with the transmitting and receiving multiplexes to switch the input of one of said channels at the time of successive assignments of that channel to the transmission link from one to another of sources of signals of a relatively narrow band of frequencies, said switching means including at each end of the system a pair of gate tubes alternately enabled at the submultiple of said rate to control modulation of said channel by said last-mentioned signals, and additional switching means operating at a submultiple of the frequency of operation of the first-mentioned switching means for alternately connecting signals from additional sources to the input of one of said gate tubes.

RALPH BOWN.

REFERENCES CITED

The following references are of record in the file of this patent:

UNITED STATES PATENTS

| Number | Name | Date |
|---|---|---|
| 1,918,252 | Dunham | July 18, 1933 |
| 1,928,093 | Coyle | Sept. 26, 1933 |
| 2,036,350 | Montani | Apr. 7, 1936 |
| 2,199,634 | Koch | May 7, 1940 |
| 2,277,192 | Wilson | Mar. 24, 1942 |
| 2,405,252 | Goldsmith | Aug. 6, 1946 |
| 2,406,165 | Schroeder | Aug. 20, 1946 |
| 2,495,739 | Labin et al. | Jan. 31, 1950 |

FOREIGN PATENTS

| Number | Country | Date |
|---|---|---|
| 475,239 | Great Britain | Nov. 16, 1937 |